Sept. 6, 1927.
L. G. SHOOK
1,641,555
BEARING LIP REMOVER
Filed May 10, 1926
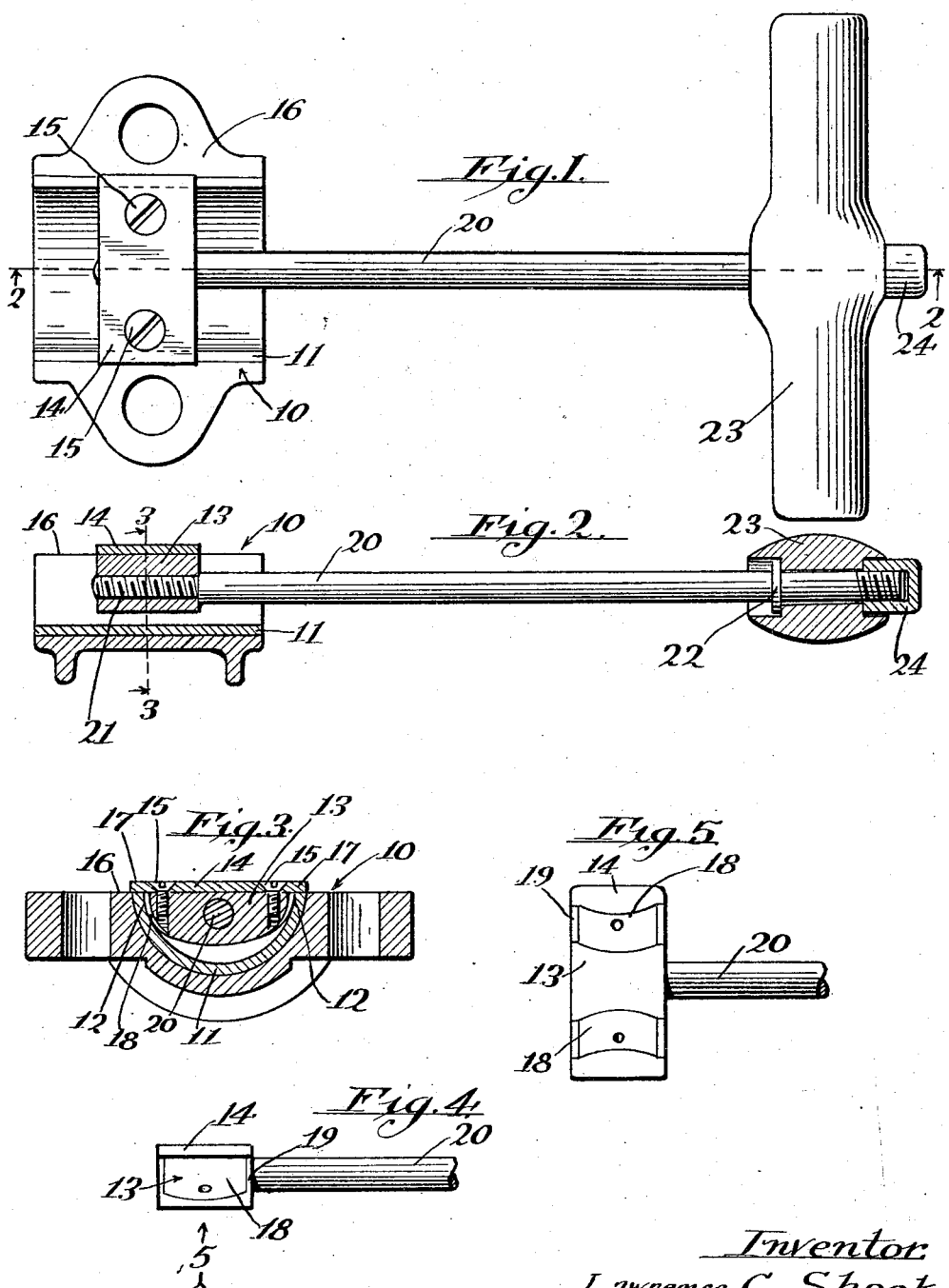

Patented Sept. 6, 1927.

1,641,555

UNITED STATES PATENT OFFICE.

LAWRENCE G. SHOOK, OF LOS ANGELES, CALIFORNIA.

BEARING-LIP REMOVER.

Application filed May 10, 1926. Serial No. 107,939.

This invention relates to a simple tool for removing bearing lips.

In pouring bearings, such as are used upon the main bearings of an internal combustion engine, the bearings are poured so that they will be undersize. After the bearing metal forming the bearings has hardened, the bearings are sometimes bored out to the approximate size and are subsequently finished to their proper size by scraping. However, machines for boring out the bearings are usually large and cumbersome and very expensive, and when no such machine is to be had, it has been common practice to separate the halves of the split bearings employed and remove the lips thereon by a rasp so that the bearings will approximately fit about the shaft or crank shaft for which they were designed and may then be scraped so as to fit.

An object of this invention is to provide a simple and inexpensive tool which will effectively remove the lips of split halves of bearings so that the halves may be assembled together about the shaft to permit the scraping to a finished size.

A further object of this invention is to provide a tool which will remove the lips evenly, so that the corners of the halves of the bearings will not tend to be rounded off as is frequently the case where a rasp is employed.

With the foregoing and other objects in view which will be made manifest in the following detailed description and specifically pointed out in the appended claims, reference is had to the accompanying drawings for an illustrative embodiment of the invention, wherein:

Figure 1 is a top plan view of the improved tool illustrated as applied to a half or cap of a split bearing, Fig. 2 is a vertical section taken on the line 2—2 of Fig. 1, Fig. 3 is a vertical section taken on the line 3—3 of Fig. 2, Fig. 4 is a side elevation of the cutter part of the tool, and Fig. 5 is a bottom plan view taken in the direction of the arrow 5 upon Fig. 4.

Referring to the accompanying drawings wherein similar reference characters designate similar parts throughout, it will be explained that when bearings are poured, they are poured undersize. A cap of a bearing is indicated at 10 having the bearing metal 11 cast and hardened thereon. When the bearing metal is cast, it is cast undersize, so that its interior radius of curvature is considerably smaller than the radius of the shaft adapted to rotate in it. To finish the bearing it is customary to place Prussian blue or the like on the shaft and then fasten the halves of the bearing about the shaft, rotating the shaft one or more revolutions. Subsequently the halves are separated and the high spots thus marked are removed by a hand scraper. Before this can be accomplished, however, it is necessary to remove the lips 12 on the halves of the bearings, so that the sides of the bearing will not prevent the shaft from engaging the bottom of the bearing metal 11 in each half.

The improved tool which is designed to remove the lips 12 sufficiently to permit the shaft to engage the bottom of the bearing consists of a cutter body 13 which is approximately semi-cylindrical in form, having its sides formed upon a radius of curvature almost equal to the radius of the shaft. The bottom of the cutter body, however, is on a radius of curvature somewhat larger, as clearly shown in Fig. 3, so that the bottom of the cutter will not cut the bottom of the bearing metal 11. On the diametrical face of the top of the cutter body 13 there is positioned a plate 14 which is fastened in place as by screws 15. The sides of the plate project laterally beyond the sides of the cutter body, forming lateral flanges adapted to engage and slide upon the face 16 of the half of the split bearing. Adjacent the flanges 17 provided by the plate 14 the arcuate surfaces of the cutter body are concaved or hollow ground, as indicated at 18. It will be understood, however, that the concavity or hollow grinding does not extend clear to the ends of the body, but merely approaches the end faces, so as to leave cylindrical surfaces 19 thereon, as clearly shown in Fig. 5. The purpose of having this construction will be subsequently described.

A shank 20 having a pin at one end, as indicated at 21, is threaded into the cutter body 13. This shank has a shoulder on its other end against which is positioned a washer 22. A wooden handle 23 is positioned on the shank 20 and is tightened against the washer 22 by means of a cap 24 threaded onto and enclosing the end of the shank 20.

The operation of the tool in as follows: When it is desired to remove the lips 12 of a half of a split bearing, the tool is positioned on the bearing, as shown in Figs. 1, 2 and 3. By means of the handle the cutter can be drawn across the bearing in either direction, and the cutting edges at the ends of the cutter body will serve to pare off or cut off so much of the bearing metal as forms the lips 12. Excess cutting is prevented by the engagement between the flanges 17 and the faces 16 on the bearing. If the cutting should be difficult, it is possible to drive the cutter across the bearing by tapping the cap 24 with the hammer or similar instrument.

The purpose of leaving the edges indicated at 19 straight or cylindrical instead of concave or hollow ground is to permit sharpening in the event that the edges should become dull. To sharpen the tool, the shank 20 can be removed and the two end faces of the cutter body can be honed. The honing causes new sharp edges to be presented and because of the construction of the tool it will be appreciated that its size will not be made smaller. It will be readily understood that the concavity on the sides of the cutter body, as indicated at 18, need not be as great or as deep as that shown, and in some instances the sides of the cutter body may be perfectly cylindrical or nearly so. The cutter body is of sufficient length as to provide sufficient bearing surface to prevent the cutter body from wobbling laterally within the bearing during the cutting.

From the above described construction it will be appreciated that an improved tool is provided for removing the lips of bearings and which in operation will be much more satisfactory than the use of a rasp. Furthermore, the tool may be easily, quickly and cheaply constructed, so that no large expenditure is necessary to provide one for use upon bearings.

It will be understood that various changes in the detail of construction may be made without departing from the spirit or scope of the invention as defined by the appended claims.

I claim:

1. A bearing lip remover comprising a cutter body having projecting lateral flanges adapted to engage upon the face of half of a split bearing, said body having arcuate cutting edges adjacent the flanges adapted to remove the lip of the bearing, and a handle secured to the body.

2. A bearing lip remover comprising an approximately semi-cylindrical cutter body, a plate secured to the diametrical face thereof and projecting beyond the sides of the cutter body to provide flanges adapted to engage upon the face of a split bearing, the arcuate surfaces of the cutter body adjacent each flange being concaved and providing two cutting edges adapted to cut the lips of a bearing, and a handle secured to said cutter body.

3. A bearing lip remover comprising an approximately semi-cylindrical cutter body, a plate secured to the diametrical face thereof and projecting beyond the sides of the cutter body to provide flanges adapted to engage upon the face of a split bearing, the arcuate surfaces of the cutter body adjacent each flange being concaved and providing two cutting edges adapted to cut the lips of a bearing, a shank threaded into the cutter body and extending from one end thereof, a handle mounted upon the end of the shank and through which the shank extends, and a cap mounted upon the end of the shank maintaining the handle thereon and providing a head on the shank adapted to be struck by a hammer or similar instrument.

4. A bearing lip remover comprising an approximately semi-cylindrical cutter body having lateral flanges adapted to engage upon the face of a half of a split bearing, the radius of curvature of said body adjacent said flanges being somewhat smaller than the radius of curvature of said body at its bottom, the arcuate edges of the body adjacent the flanges forming cutting edges adapted to remove the lips of the bearing, and a handle secured to the cutter body.

In testimony whereof I have signed my name to this specification.

L. G. SHOOK.